April 8, 1969   N. B. PROCTOR   3,436,958
ULTRASONIC PIPE TESTING METHOD AND APPARATUS
Filed Oct. 11, 1965   Sheet 1 of 3
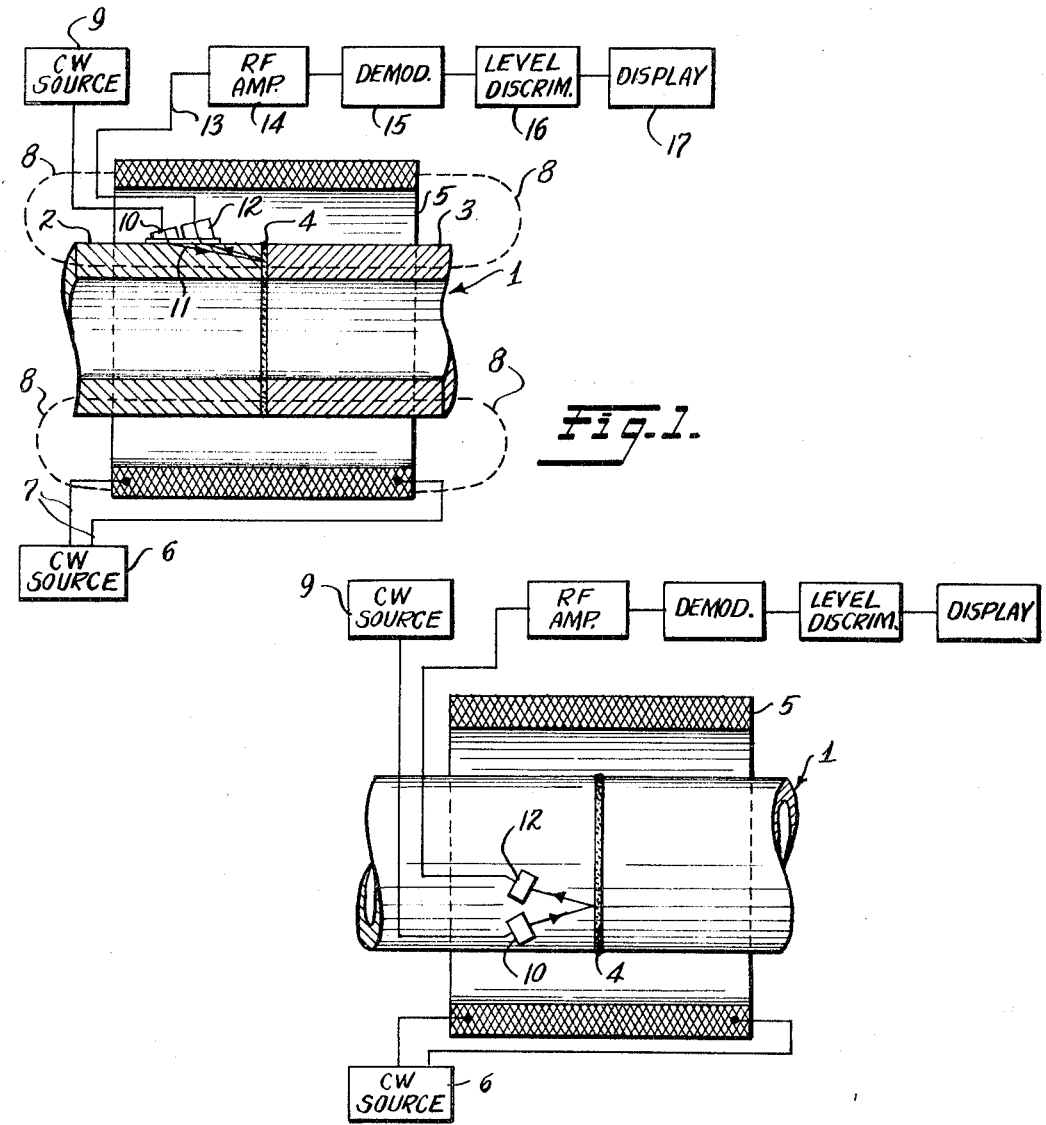
INVENTOR
Noel B. Proctor
BY Arnold & Roylance
ATTORNEYS

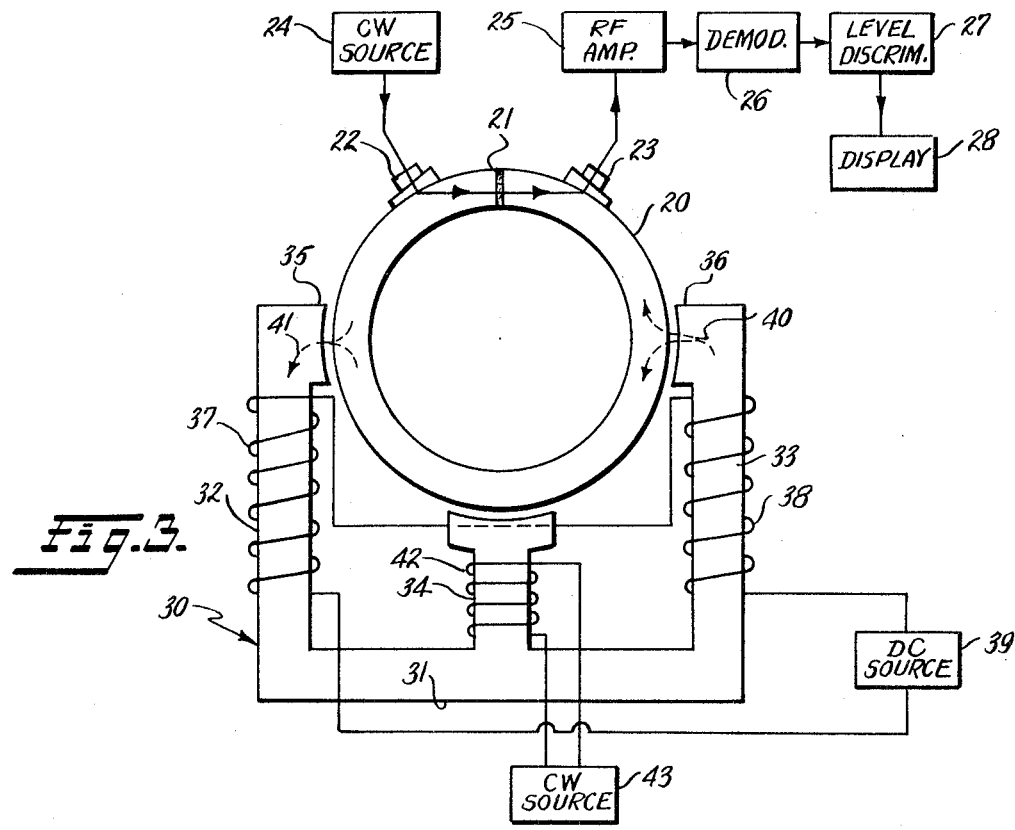

MAIN BANG (MB) ONLY
(NO TEST PIECE)
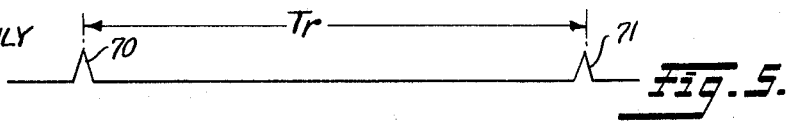
Fig. 5.
NO FLAW
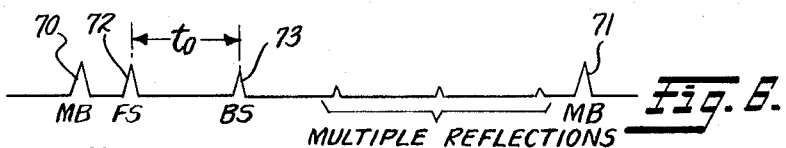
Fig. 6.
THIN WALL
$t_1 < t_0$
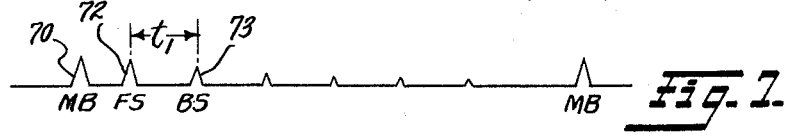
Fig. 7.
PIT
$t_2 < t_0$
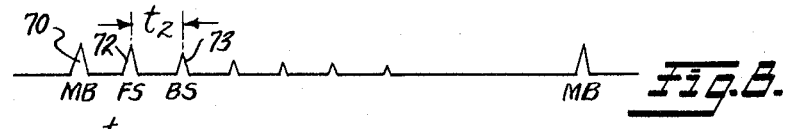
Fig. 8.
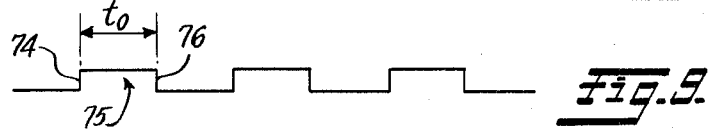
Fig. 9.
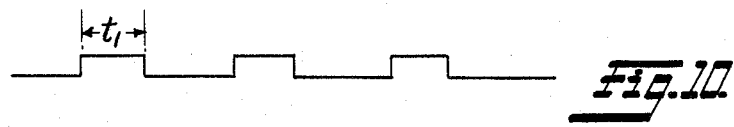
Fig. 10.
Fig. 11.
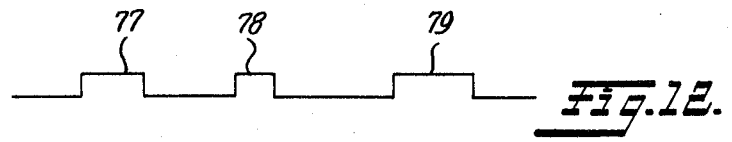
Fig. 12.
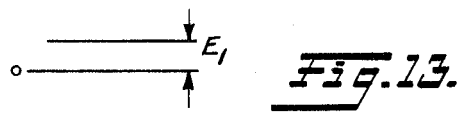
Fig. 13.
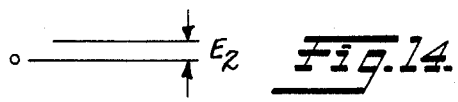
Fig. 14.
Fig. 15.
INVENTOR
Noel B. Proctor
BY Arnold & Roylance
ATTORNEYS

United States Patent Office

3,436,958
Patented Apr. 8, 1969

3,436,958
ULTRASONIC PIPE TESTING METHOD AND APPARATUS
Noel B. Proctor, Houston, Tex., assignor to American Machine & Foundry Company, New York, N.Y., a corporation of New Jersey
Filed Oct. 11, 1965, Ser. No. 494,434
Int. Cl. G01n 9/24
U.S. Cl. 73—67.6        11 Claims

ABSTRACT OF THE DISCLOSURE

This application discloses apparatus and methods for inspection of ferromagnetic members such as steel pipe by directing a beam of ultrasonic energy into the pipe and detecting reflected energy, while stressing the pipe magnetostrictively at a given frequency so that flaws will cause modulation of the reflected energy at such frequency.

---

This invention relates to testing for flaws in ferromagnetic members, and more specifically to a method of testing ferromagnetic tubular members for very small voids or inclusions, and to apparatus for performing such tests.

Ultrasonic energy has long been used in flaw detection in members of various types and shapes. Generally, the techniques which have been developed have been very successful. However, certain types of flaws are not detectable or are not distinguishable by presently used techniques.

One such type of flaw is an ultrathin laminar inclusion or crack in the member, which previously has been either not detectable at all, or not distinguishable from some other type of imperfection, such as an abnormally thin region or a pitted region. The kind of indication given by conventional testing apparatus depends generally on the orientation of the flaw with respect to the member under test, a laminar inclusion parallel to the surface of the member most often giving an indication indistinguishable from an abnormally thin section. It is evident that this distinction is important, since a thin laminar inclusion may be a relatively unimportant flaw, while a thin portion might necessitate rejection of the entire piece. This problem is generally discussed in The American Society of Mechanical Engineers paper number 57–PWR–11, by S. Serabian and C. D. Moriarty. A solution suggested in that paper was to cold-work the member under test to alter the character of the void or inclusion rendering it more easily detectable. That solution is, of course, quite limited in usefulness because it is generally not practical or desirable to cold-work every piece to be tested.

Another type of flaw which is extremely difficult to detect by conventional techniques is that resulting from an imperfect bond in a member which has been welded by the well-known electric resistance technique. This defect is often referred to by the terms cold weld, paste weld, or lack of fusion. When examining a weld area ultrasonically, the density change due to a good weld is generally indistinguishable from any but the most extreme defective welds.

It is therefore an object of the present invention to provide a method for testing ferromagnetic members to detect flaws not detectable by conventional non-destructive testing techniques.

Another object is to provide an apparatus for rendering flaws in ferromagnetic members detectable by ultrasonic inspection techniques.

Yet another object is to provide apparatus for detecting thin laminar inclusions or voids in ferromagnetic members, and for distinguishing such flaws from other types of flaws.

A further object is to provide apparatus for distinguishing defective weld zones in welded ferromagnetic members from good welds.

A still further object is to provide apparatus for detecting and identifying laminar flaws or defective welds in tubular ferromagnetic members.

Briefly described, the present invention depends on the concepts that a flaw within a member under test undergoes a change in shape and volume when the member is subjected to a stress or strain, and that ultrasonic energy transmitted through the member so as to impinge upon the flaw will be reflected from or transmitted through the flaw differently as the flaw shape changes. These general concepts are discussed in Wright Air Development Division (WADD) Technical Reports number 60–157, by R. R. Whymark and W. E. Lawrie (May 1960), and number 61–91 by W. E. Lawrie (April 1961). In those papers the authors describe a method of testing for internal flaws in a laboratory environment by cyclically varying the volume of a flaw by vibrating the specimen at a first frequency and simultaneously exciting the specimen with ultrasonic energy at a second, higher, frequency. The result, if a flaw exists in the specimen, is modulation of the higher frequency by the lower frequency, caused by the varying volume of the flaw and the effect of that volume change on the reflected or transmitted energy. If no flaw exists in the specimen, no modulation occurs.

The method of the present invention employs the technique of inducing an alternating magnetic field in the member being tested to create alternating peaks of stress within the member, simultaneously introducing ultrasonic energy into the member, and receiving and interpreting the ultrasonic energy after it has passed through the magnetically stressed portion of the member. Modulation of the received ultrasonic energy will then indicate the presence of a flaw, and interpretation of this information can reveal the nature and location of that flaw.

An obvious disadvantage to the techniques discussed in the WADD Technical Reports is the slowness with which the tests can be made. In an industrial environment, it is frequently desirable to continously test an elongated member throughout its length. The apparatus of the present invention provides for such testing, disclosed as it can be used to test pipe or other tubular bodies.

One apparatus embodiment herein disclosed is operative to test a weld extending circumferentially around a pipe, and employs a magnetizing coil which surrounds a pipe in a direction to induce a longitudinal magnetic field in all or a portion of the pipe. Ultrasonic transmitting and receiving transducers are acoustically coupled to the exterior surface of the pipe to introduce ultrasonic wave energy longitudinally into the wall of the pipe, and to receive reflected energy. The magnetizing coil is energized from a source of continuous wave alternating current at a first frequency, and the transmitting transducer is energized from a source of continuous wave alternating current at a second, somewhat higher frequency. The receiving transducer is connected to suitable sensing, interpreting, and display units.

Another embodiment utilizes a magnetizing apparatus for inducing a circularly traveling magnetic field to stress a longitudinal weld or seam in a tubular member. Ultrasonic transducers are appropriately placed and acoustically coupled to the pipe surface to scan the seam.

A third embodiment, especially adapted for testing for thin laminar voids or inclusions, and for distinguishing these from the wall portions or pits, utilizes a tandem transducer having a first transducer acoustically coupled to the pipe wall for introducing high frequency waves into the wall, and a second transducer radially outwardly spaced from the first, but acoustically coupled to the same wall zone, for providing the lower frequency stressing energy. The high frequency transducer, in this embodiment, includes the transmitting and receiving portions, the latter being connected to suitable sensing equipment.

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a schematic diagram ilustrating an embodiment of the invention employed to inspect circumferential butt welds in a tubular test piece, the test piece being shown in longitudinal section;

FIG. 2 is a view similar to FIG. 1 but showing another embodiment of the invention with an alternative transducer arrangement, the test piece being illustrated in side elevation;

FIG. 3 is a schematic diagram of another embodiment of the invention, adapted for testing a longitudinal seam in a tubular test piece, the test piece being shown in transverse cross-section;

FIG. 4 is a schematic diagram of yet another embodiment of the invention which is operative to discriminate between thin wall sections or pits, on the one hand, and inclusion flaws, on the other hand, the test piece being shown partially in longitudinal section and partially in side elevation; and FIGS. 5–14 are waveform diagrams showing the electrical signals appearing at various points in the embodiments of FIG. 4.

Referring now to FIG. 1, the apparatus is shown therein with a ferromagnetic member to be tested, indicated generally at 1, the member including a first section of pipe 2 and a second section of pipe 3, joined by a bond such as a circumferential flash or friction weld 4. In this embodiment, the apparatus is designed especially to inspect the weld for a poor or incomplete bond in the weld zone. As hereinbefore discussed, the apparatus is based on the concept of cyclically stressing the test member at the portion being examined. In the apparatus of FIG. 1, the stressing force is applied by a magnetizing coil 5 which encircles the test piece at the portion of interest. A source 6 of continuous wave (CW) electric current is connected by conductors 7 to the terminals of magnetizing coil 5. When energized, coil 5 produces a magnetic field, in a manner which will be recognized by one skilled in the art, the field extending longiudinally through the tubular magnetic members 2 and 3, as indicated by broken lines at 8. The CW source 6 being an AC source, the direction of the field diagrammatically indicated at 8 will reverse at the frequency of the CW source. The magnetrostrictive properties of test member 1 will then cause the member to internally deform, thereby changing the geometry of any inclusion or void at the weld 4, amounting to a change in the volume of such a flaw. This volume change will, of course, occur at the frequency of source 6.

A second CW source 9 is connected to a conventional ultrasonic transmitting transducer 10, which is acoustically coupled by well-known techniques to a portion of the exterior surface of test member 1. Source 9 is again an AC generator which provides alternating current to transducer 10. Tranducer 10 is a piezoelectric device of conventional design which is capable of accepting the alternating current from source 9 and converting it into ultrasonic wave energy, and coupling that energy into the tubular member 1. A portion of this energy indicated diagrammatically at 11 is directed toward the surface of weld 4. Although only one line is shown in FIG. 1, the energy radiating from transducer 10 disperses to some extent and impinges upon the total cross-sectional area of weld 4 at the angular position in the tubular member at which transducer 10 is coupled to its surface. It will be recognized that to test the entire weld, member 1 is advantageously supported by an apparatus (not shown) capable of rotating member 1 about its longitudinal axis, thereby allowing the total length of the weld to be scanned by the ultrasonic energy produced by transducer 10.

Since the weld 4 comprises an anomaly in the general structure of member 1, a significant percentage of the energy impinging on the weld will be reflected. A significant portion of this reflected energy is received by a second transducer 12 which is acoustically coupled to the surface of member 1 in the manner of transducer 10. Transducer 12 is also a piezoelectric device of conventional design, and is capable of accepting ultrasonic wave enrgy and transducing that energy into the form of an electrical signal. The electrical signal produced by transducer 12 is connected via conductor 13 to the input terminal of an amplifier 14 where the signal is amplified to a more usable level.

If no flaw exists in weld 4, and if the bond between members 2 and 3 at weld 4 is complete, the energy received at transducer 12 will be unmodulated and will be at the same frequency as the energy transmitted by the transducer 10. Although the entire member is being cyclically stressed by the magnetostrictive action in response to the magnetization produced by coil 5, this minor change in the material has no significant effect on the ultrasonic wave energy. However, if a void or other inclusion exists at the weld, or if the weld is incomplete, the volume change of the flaw has a distinct effect on the ultrasonic wave energy. The effect is manifested as a modulation of the wave energy at the frequency of the stressing force. Thus, if source 6 produces energy at 10 kilocycles per second, and if source 9 produces energy at 5 megacycles per second, the energy received at transducer 12 when a flaw exists at weld 4 will be a 5 megacycle wave amplitude modulated by 10 kilocycles. As will be recognized by one skilled in the art, this type of signal can readily be analyzed by conventional demodulation techniques to determine not only the presence of such a flow, but also the extent and type of the flaw. One such apparatus is schematically indicated in FIG. 1, wherein the output of amplifier 14 is connected to the input of a demodulator or detector 15, wherein the signal is demodulated. The output of the demodulator 15 is connected to a level discriminator signal 16 which can be adapted to provide both qualitative and quantitative data concerning the size and type of flaws at the weld zone. The output of the level discriminator is then coupled to a display or readout device 17, to provide a visual indication of the presence and characteristics of the detected flaws. It will also be recognized that the information derived from discriminator 16 can be employed to actuate a marking device to mark the particular point on member 1 where the flow exists.

In the embodiment shown in FIG. 1, transducers 10 and 12 are shown coupled to the outer surface of the pipe along a line on the surface parallel to the longitudinal axis of the pipe. An alternative arrangement for location of transducers 10 and 12 is shown in FIG. 2. All of the apparatus except for the transducers shown in FIG. 2 is the same as that of FIG. 1, the CW source 6 being connected to magnetizing coil 5, and the coil being positioned around tubular member 1 at the portion of the member which includes weld 4. In the FIG. 2 embodiment, transmitting transducer 10 is positioned at an angle with the longitudinal axis of the pipe so that the majority of the wave energy injected into the pipe by transducer 10 is not reflected back to transducer 10, but is reflected toward transducer 12 which is circularly spaced from transducer 10 and which is also placed at an angle to the longitudinal axis of the member to most efficiently receive the greater percentage of the energy reflected from the weld zone. Again, transducer 10 is energized by continuous wave source 9, and transducer 12 is connected to an amplifying and demodulating network such as that described with reference to FIG. 1.

Turning now to FIG. 3, it will be seen that a substantially modified apparatus is provided therein to examine a bond of a different type in a tubular member. In FIG. 3, the tubular member 20 which is being examined is of the type which includes a longitudinal weld or seam 21 which extends approximately parallel to the longitudinal axis of the member. To examine this type of weld, a transmitting transducer 22 is acoustically coupled to the exterior surface of member 20 and is oriented to direct the greater part of its transmitted wave energy in the direction of the weld. A receiving transducer 23 is similarly acoustically coupled to the exterior surface of member 20, and is circularly spaced from transducer 22 at approximately the same angle from weld 21 as is transducer 22. Transducers 22 and 23 are both of a type which, when provided with electrical signals, will produce wave energy, or when physically stressed as by wave energy, will produce electrical signals in accordance with the well known piezoelectric effect.

An continuous wave alternating current source 24 is connected to the input of transducer 22 to provide the necessary electrical excitation. The electrical signal produced by transducer 23 in response to the impinging wave energy thereon is connected to the input of an RF amplifier 25, the output of which is connected to the input of a demondulator unit 26. Units 25 and 26 perform substantially the same functions as similar units 14 and 15 described with reference to FIGS. 1 and 2. Also, in like manner, the output of demodulator unit 26 is connected to a level discriminator circuit 27, the output of which is connected to a display unit 28.

The tubular member 20 is magnetized by an apparatus which includes a core of highly permeable magnetic material, indicated generally at 30, which is in the shape of a letter E but with the vertical portion of the E disposed in a horizontal plane forming the core portion 31, and with the two outer legs of the E extending vertically upwardly forming core portions 32 and 33. The center leg of the E extends vertically upwardly from portion 31 forming core portion 34. The distal ends of portions 32 and 33 are provided with short stubs 35 and 36, respectively, which extend radially inwardly toward the center of member 20, the faces of stubs 35 and 36 being curved to conform approximately to the outer surface of member 20, allowing the stubs to be placed closely adjacent that surface and minimizing the air gaps between core 30 and member 20. Core portion 34 likewise extends radially inwardly toward the center of member 20, and has a face portion curved to conform to the surface of member 20, also to minimize the air gap.

Core portions 32 and 33 are provided with coils 37 and 38, respectively, each coil including a plurality of windings, the two coils being connected, in series aiding relationship, to a source of direct current 39. Windings 37 and 38, when energized from source 39, provide a magnetic flux field which is diagrammatically indicated by the dotted arrows 40 and 41, this being a unidirectional field.

Core portion 34 is provided with a plurality of windings forming a coil 42, the ends of which are connected to a source of alternating current 43. When energized, a flux is established in core portion 34 and through the magnetic circuit including member 20 and legs 31, 32, and 33 which will alternately reinforce and oppose the unidirectional field established by coils 37 and 38. The alternating field established by coil 42 will have its greatest effect in opposing the undirectional field in that portion of the core which appears below the horizontal centerline of member 20 in FIG. 3, but it will be clear that when that portion of the unidirectional field passing through the lower portion of member 20 is opposed, the unidirectional field passing through the upper portion and the weld zone being tested will be greatly enhanced, and that when the field in the lower portion is being reinforced the field in the upper portion will be diminished.

By providing a basic unidirectional field using source 39 and coils 37 and 38, the overall flux density of the magnetic field, and therefore the stressing force, in member 20 can be made quite large but the power requirements on CW source 43 can be minimized.

The frequency of the current provided by source 43 is advantageously a resonant frequency of member 20. When such a resonant frequency is utilized, the stress applied to member 20 and particularly to the zone including weld 21, will be much greater than the stress provided by a currnet supplied at a non-resonant frequency. At this resonant frequency, weld 21 is cyclically stressed at the frequency of source 43, and any voids or inclusions occurring as a result of a lack of fusion at the weld will change geometry cyclically at that same frequency. It will therefore be clear, by the same theory discussed with reference to FIGS. 1 and 2, that the wave energy passing through the zone of weld 21 from transducer 22 to transducer 23 will be modulated by the frequency of source 43. The modulated signals ariving at transducer 23, if a flaw exists, and thereafter provided in the form of electrical signals to amplifier 25 and remodulator 26, can be easily analyzed by the circuits to detect the existence and the characteristics of flaws existing in the weld. In order that the apparatus can efficiently scan the entire length of a longitudinal bond as weld 21, member 20 is supported, by apparatus not shown, on rollers or the like, and is driven so as to pass through the magnetizing apparatus and the testing apparatus longitudinally without substantial rotational movement. The apparatus can then be efficiently employed to examine a longitudinal seam in an entire pipe in a relatively short period of time, the display unit 28 being coordinated with longitudinal movement of the pipe to give a visual indication of the existence and magnitude of defects, and their relative location in the pipe.

It should be noted that in the embodiment of FIG. 3, wherein the pipe undergoes resonant vibration, the transducers 22 and 23 are most advantageously coupled to the surface of member 20 at nodes of vibration, i.e., points of minimum cyclic movement, to avoid modulation of the signal from transducer 22 before it reaches weld 21 or before it reaches trasnducer 23.

Referring now to FIG. 4, a different approach to the problem of internally testing a pipe for defects but incorporating the broad concept of the subject invention is shown in testing a tubular ferromagnetic member indicated generally at 50 in which a number of typical defect types exist. In this embodiment, the concern is not primarily with detection of defects in bonds, but in detecting and distinguishing between various other types of defects. These are shown in FIG. 4 as a thin wall portion 51, a pit 52, and a laminar inclusion or void 53. As indicated above, for particular applications of the tubular member, particular types of flaws may not diminish the value of the pipe, whereas the existence of other types of flaws would necessitate categorizing that particular piece of pipe as an unusable reject. It is therefore important that the various types of flaws not only be detected, but be distinguished from each other as to their characteristics. An apparaus to accomplish these ends is shown as including a compound transducer assembly indicated generally at 54, this transducer assembly including a transmitting and receiving transducer crystal 55 and a second transmitting and receiving transducer crystal 56. Crystals 55 and 56 are mounted in a housing diagrammatically indicated at 57 which acts to support the crystals and to provide efficient acoustic coupling between both crystals and the surface of member 50. Housing 57 can include resilient lips in contact with pipe member 50, and can be of the type wherein fluid is caused to contact both of the transducers and also the test surface. This type of transducer is well known in the art, and need not be described in greater detail here.

As shown in FIG. 4, crystal transducer 55 is smaller in physical dimension than crystal transducer 56. Transducer 55 is cut to operate at a somewhat higher frequency than is 56, and is connceted to a pulse generator 58 which is capable of producing pulses of energy at a predetermined frequency and at a preselected repetition rate. Crystal 56 is connected to a continuous wave source of alternating current 59 which excites transducer 56 to produce wave energy at a preselected frequency.

Crystal 55 is also connected to a gated pulse amplifier 60, the output of which is connected to a digital to analog converter 61 which is a conventional apparatus designed to produce an analog signal proportional to the length of pulses provided thereto. One output of converter 61 is connected directly to an analog display or read-out device 62 which is capable of displaying for visual observation the analog function developed by unit 61. A second output of unit 61 is connected to a demodulator 63 which demodulates the signal produced by unit 61 and provides an output to a void indicator 64.

Analogizing the apparatus of FIG. 4 to the previously described embodiments, continuous wave source 59 and transducer 56 can be analogized to continuous wave source 43 and the magnetizing apparatus of FIG. 3, in that transducer 56 provides the continuous low frequency excitation for the test sample which causes internal stress within the sample and causes the various types of defects appearing in the test member to change geometry and thus to modulate the test signal in a particular way which can be identified, and which provides the information by which the presence and characteristics of the various defects can be detected and distinguished. Continuing this analogy, transducer 55 and pulse generator 58 can roughly be analogized to transducer 22 and CW source 24 of the embodiment of FIG. 3.

The operation, however, is somewhat different in that a pulse source is used to excite crystal 55 rather than a CW source. At this point it is helpful to refer to FIGS. 5–14, for further explanation of the embodiment of FIG. 4. In FIG. 5, the initial pulse 70 represents the transmitted pulse produced by the excitation of transducer 55 by the pulse generator, this pulse being referred to as the "main bang." If no test piece were coupled to the transducer, the next occurring pulse would be logically the next main bang, illustrated in FIG. 5 as pulse 71. The time between the main bank is shown as $T_r$, the frequency of the pulse generator 58 then being $1/T_r$. These same pulses are used in FIGS. 6, 7 and 8 as the reference pulses for the information reflections received by crystal 55.

FIG. 6 shows the reflections occurring when no flaw exists in the portion of pipe being examined. In this circumstance, the next pulse occurrence is the reflection from the front surface of the member 50, the delay between the main bang pulse 70 and the front surface (FS) pulse 72 being due to the time lapse because of the distance through the coupling medium from the face of transducer 55 to the exterior surface of member 50. The next pulse is the back surface (BS) pulse 73, the time $T_0$ being a measure of the thickness of the pipe. It will be noted that in FIG. 6 that between the back surface pulse and the second main bang 71, minor pulses appear, which would be due to multiple echo reflections between the front and back surfaces of the pipe. These are of considerably diminished amplitude compared with the major pulses discussed, and are of little significance.

The circumstance illustrated in FIG. 7 arises when testing a portion of the tubular member having a wall section thinner than the normal wall section tested in FIG. 6. The main bang and front surface pulses 70 and 72 appear as in FIG. 6, but the back surface pulse occurs a shorter time later than in a normal pipe, i.e., $T_1$ is a shorter time than $T_0$.

The occurrence of a pit wherein the wall portion is diminished in thickness more radically than in a thin wall section, but over a smaller area, is illustrated in FIG. 8, wherein the time lapse between the front surface pulse and the back surface pulse is still less than in the condition of FIG. 7.

The information accepted by transducer 55, as shown in FIGS. 6–8, is connected to the gated amplifier 60. It will be clear that both the pulse generator output and the output from transducer 55 will appear at the input to amplifier 60, but the pulse output of generator 58 will have no effect on the gated amplifier unless a gating signal is also provided to amplifier 60. This gating signal is provided by a delay circuit shown in FIG. 4 as a variable resistance 65. Thus amplifier 60 will be gated a preselected interval of time after a pulse from pulse generator 58 has been conducted to transducer 55, opening the input of amplifier 60 to pulses received by transducer 55. The output of amplifier 60 is connected to converter 61 and the remaining units, as previously described. Unit 61 includes a bistable circuit which is actuated or turned on initially by the front surface pulse, and is deactivated or turned off by the back surface pulse, thereby producing a square pulse similar to that shown in FIG. 9. The leading edge 74 of pulse 75 in FIG. 9 will therefore be coincident with the front surface pulse, and the trailing edge 76 coincident with the back surface pulse. FIG. 9 therefore illustrates three pulses resulting from three transmitted and received pulses from a pipe of normal thickness.

In FIG. 10, it will be seen that the width of each pulse is diminished relative to the space between pulses. This illustrates the condition shown in FIG. 7, wherein a thin wall section is encountered, and the time between the front surface pulse and the back surface pulse is diminished. As will be obvious to one skilled in the art, the average voltage of the pulse train of FIG. 9 can be represented as a DC voltage shown at FIG. 13, wherein the value is a voltage $E_1$, derived by determining the area of the pulses over a period of time. The average value of the pulses shown in FIG. 10, however, is less than that of FIG. 9, since the ratio of ON time to OFF time is decreased. This can be represented as shown in FIG. 14, wherein the value $E_2$ is smaller than the value of $E_1$. Thus the output of the converter 61 can be represented as in FIG. 13 or 14 for the two circumstances described. A similar circumstance can be shown for FIG. 11, wherein the time $T_2$ represents the pulse spacing for a pit condition.

A different circumstance arises when a laminar inclusion or void such as is shown at 53 in FIG. 4 is encountered. In this circumstance, because of the stressing created by the low frequency, high power ultrasonic energy produced by transducer 56, the geometry of inclusion 53 is cyclicly modified, and the reflections vary from pulse to pulse between adjacent pulses transmitted by tranducer 55. In this circumstance, the pulses will not be of equal length, but will vary in a more or less sinusoidal fashion in accordance with the frequency of the continuous wave source 59 and the wave energy produced by transducer 56. Thus, in FIG. 12, pulse 78 is shorter than pulse 77, but longer than pulse 79. This result will yield an analog output from unit 61 resembling that of FIG. 15, wherein the DC level varies relatively rapidly at the frequency of source 59. It is significant that although the DC values through which the voltage produced as a result of a laminar inclusion may pass through the same values as, for example, a pit, because it may be at the same depth as the laminar inclusion, these results are distinguishable because of the change in geometry of the laminar inclusion which does not arise with a pitted or thin wall condition.

The varying voltage produced by converter 61 when an inclusion is encountered is demodulated by unit 63, and thereafter displayed by the void indicator 64.

While certain advantageous embodiments have been shown to illustrate the invention, it will be understood by those skilled in the art that various changes and

What is claimed is:

1. An apparatus for inspecting an elongated ferromagnetic member for flaws comprising the combination of
   first source means for providing electrical energy cyclicly varying at a first frequency;
   first transducer means connected to said first source means for converting said electrical energy to a different form of energy and applying the same to a portion of the ferromagnetic member to cyclicly stress that portion of the member; said first transducer means comprising magnetizing means for inducing a cyclicly varying magnetic field in said portion of said ferromagnetic member when provided with electrical energy from said source;
   second source means for providing electrical energy cyclicly varying at a second frequency,
      said second frequency being significantly higher than said first frequency;
   second transducer means connected to said second source means for converting the electrical energy from said second source means to ultrasonic wave energy and injecting said wave energy into the portion of said ferromagnetic member being stressed by energy from said first transducer;
   receiver means for receiving wave energy emerging from said ferromagnetic member and transducing said wave energy into electrical signals; and
   circuit means connected to said receiver means for detecting in said electrical signals modulation of said second frequency by said first frequency, said modulation being indicative of a flaw in said member.

2. An apparatus according to claim 1 wherein
   said magnetizing means comprises a cylindrical magnetizing coil surrounding said portion of the ferromagnetic member,
      said magnetizing coil being operative, when energized, to induce a magnetic field longitudinally in said member.

3. An apparatus according to claim 2 wherein
   said portion of said elongated ferromagnetic member includes a bonded zone extending transversely within said member, and
   said second transducer means is adapted to direct wave energy toward said bond longitudinally of said member.

4. An apparatus according to claim 1 wherein
   said magnetizing means comprises a core of magnetic material disposed transversely of said ferromagnetic member, said core comprising
      a first leg extending to a first zone adjacent an outer surface of said member, and
      a second leg extending to a second zone adjacent an outer surface of said member and spaced from said first zone; and
   said magnetic means further comprises at least one energizing winding surrounding a portion of said core, said magnetizing means being operative when energized to induce a cyclicly varying magnetic field transversely in said member.

5. An apparatus for inspecting an elongated tubular ferromagnetic member of a type having a bond extending substantially parallel to the longitudinal axis of said member comprising the combination of
   first source means for providing electric energy cyclicly varying in amplitude at a first frequency;
   magnetizing means disposed transversely of said tubular member for inducing in said member a cyclicly varying magnetic field transversely in said member at said first frequency, said magnetizing means comprising
      a core member forming a continuous highly permeable magnetic circuit between two zones adjacent the exterior surface of said tubular member, said zones being on opposite sides of said member,
      a core leg forming a part of said core member and having a distal end adjacent an area of the exterior surface spaced from said two zones,
      a first coil encircling said core leg and connected to said first source means, and a second coil encircling said core member and being connectable to a source of direct current;
   second source means for providing electric energy cyclicly varying in amplitude at a second frequency, said second frequency being significantly higher than said first frequency;
   transmitting transducer means connected to said second source means and coupled to the surface of said tubular member at a point spaced from said magnetizing means for transmitting acoustic energy into said tubular member at said second frequency in the direction of the longitudinal bond;
   receiving transducer means coupled to the surface of said tubular member for receiving acoustic energy emanating from said bond and for converting said enregy into electrical signals;
   circuit means connected to said receiving transducer for demodulating the electrical signals produced thereby and for detecting the presence of signals at said second frequency modulated by said first frequency.

6. An apparatus in accordance with claim 5 wherein
   said first frequency is a resonant frequency of said tubular member, and
   said transmitting and receiving transducer means are coupled to points on said surface which constitute zero nodes of vibration at the resonant frequency.

7. A method for testing a ferromagnetic member for very thin flaws comprising the steps of
   inducing an alternating magnetic field in the member at a first frequency to provide a cyclically varying stress to any flaws within the member;
   transmitting ultrasonic wave energy through the member at a second frequency greater than the first frequency;
   receiving the ultrasonic energy after it has passed through at least a portion of the member, and
   detecting the occurrence of amplitude modulation of the second frequency by the first frequency,
      the occurrence of such amplitude modulation being indicative of the presence of a flaw within the member under test.

8. Apparatus for inspecting an elongated ferromagnetic member for flaws comprising:
   means for inducing an alternating magnetic field in the member at a first frequency to provide cyclically varying stress to any flaws within the member,
   means for transmitting ultrasonic energy into the member and for detecting ultrasonic energy exiting from the member after it has passed through at least a portion of the member, the ultrasonic energy being at a frequency much higher than the first frequency,
   and means for indicating amplitude modulation of the detected ultrasonic energy at said first frequency to thereby indicate the presence of a flaw within the member.

9. Apparatus according to claim 8 wherein the member is a hollow cylinder.

10. Apparatus according to claim 9 wherein the means for inducing an alternating magnetic field includes a coil generally surrounding the member to induce a longitudinal field, the member having a transverse bond to be inspected.

11. Apparatus according to claim 9 wherein the means for inducing an alternating magnetic field includes transversely spaced pole pieces to produce a circumferential field, the member having a longitudinal bond to be inspected.

(References on following page)

References Cited

UNITED STATES PATENTS 3,226,976  1/1966  Wood et al. _____ 73—67.9

OTHER REFERENCES

Lawrie, W. E.: Ultrasonic Methods for Nondestructive Evaluation of Ceramic Coatings, Wadd Technical Report 69–91, April 1961.

RICHARD C. QUEISSER, Primary Examiner.
JOHN P. BEAUCHAMP, Assistant Examiner.

U.S. Cl. X.R.

73—67.7, 67.8, 67.9